United States Patent [19]

Katnik

[11] Patent Number: 4,474,159
[45] Date of Patent: Oct. 2, 1984

[54] LINE FOR FLUIDS

[75] Inventor: John M. Katnik, Clarkston, Mich.

[73] Assignee: Robert Bosch GmbH, Stuttgart, Fed. Rep. of Germany

[21] Appl. No.: 425,809

[22] Filed: Sep. 28, 1982

[30] Foreign Application Priority Data

Jun. 24, 1982 [DE] Fed. Rep. of Germany ....... 3223556

[51] Int. Cl.³ .......................................... F02M 55/00
[52] U.S. Cl. .................................. 123/468; 123/470; 239/600
[58] Field of Search ............... 123/468, 469, 470, 471; 239/596, 600

[56] References Cited

U.S. PATENT DOCUMENTS 3,929,109 12/1975 Chamberlain ...................... 123/468
4,294,215 10/1981 Hans et al. ......................... 123/469
4,307,693 12/1981 Glockler et al. ................... 123/469
4,327,690 5/1982 Sauer et al. ....................... 123/468

FOREIGN PATENT DOCUMENTS 2833659 2/1980 Fed. Rep. of Germany ...... 123/468
3014066 10/1981 Fed. Rep. of Germany ...... 123/470
2024937A 1/1980 United Kingdom ................ 123/468

Primary Examiner—Magdalen Y. C. Moy
Attorney, Agent, or Firm—Edwin E. Greigg

[57] ABSTRACT

An improved fluid-carrying line, such as a fuel line for distributing a liquid to several connections. The fuel line is formed by extrusion with a passage therethrough and, extending parallel to it, a bulged portion, preferably of rectangular cross-section, in which are provided two oppositely-disposed grooves. The grooves are formed so as to cooperate with spring clamps to retain fuel injection nozzles in bores disposed in the bulged portion of the fuel line.

7 Claims, 5 Drawing Figures

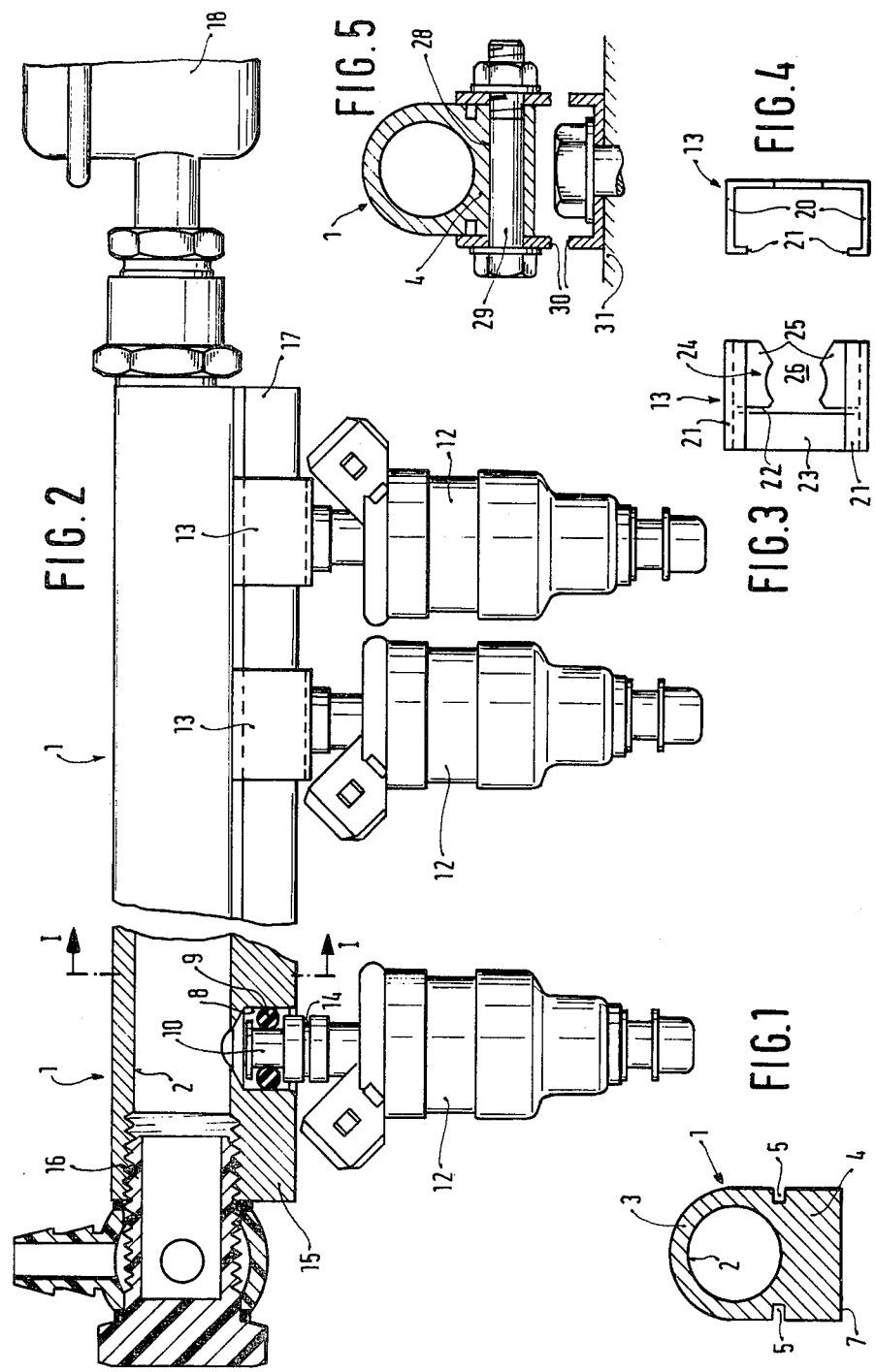

LINE FOR FLUIDS

BACKGROUND OF THE INVENTION

The present invention forms an improvement upon fluid lines used in fuel injection systems. Fluid lines comprising fuel distribution lines to the fuel injection valves of a fuel injection system for internal combustion engines are already well known; however, these lines do not allow for ease of adaptation to the individual needs of particular fuel injection system layouts for various engines.

OBJECT AND SUMMARY OF THE INVENTION

It is a principal object of the invention to provide an improved fluid line having the advantage that the line can be produced very simply and provided with receiving bores for the connection of fuel injection valves.

It is another object of the invention to form the line by means of extrusion.

It is still another object of the invention to form finished lengths of line from the unfinished line and equip the line with the receiving bores for the fuel injection valves at the locations desired.

It is yet another object of the invention to provide a fluid line which can be manufactured from aluminum or plastic.

The invention will be better understood and further objects and advantages thereof will become more apparent from the ensuing detailed description of a preferred embodiment taken in conjunction with the drawings.

BRIEF DESCRIPTION OF THE DRAWINGS

An exemplary embodiment of the present invention is shown in simplified form in the drawings and further expained in the following description.

FIG. 1 is a cross section through a fluid line in accordance with the present invention along the line I—I in FIG. 2;

FIG. 2 is a partial sectional view of a fluid line equipped with fuel injection valves to serve as a fuel distribution line;

FIG. 3 is a cross-sectional view of clamp for fastening the injection valves on the fluid line;

FIG. 4 is another view of the clamp shown in FIG. 3; and

FIG. 5 is a cross sectional view through a fluid line provided with a fastening element.

DESCRIPTION OF THE PREFERRED EMBODIMENT

A fluid line 1 is shown in cross section in FIG. 1, which is used, for instance, as shown in FIG. 2, as a fuel distribution line for the fuel injection apparatus of an internal combustion engine. The fluid line is provided with passage 2 whose cross-section is advantageously embodied circularly. The fluid line is constructed as follows: Viewed in cross-section as shown in FIG. 1, the fluid line 1 comprises a semi-circular portion 3 adjoining an integral bulged portion 4 offstanding from it, which bulged portion preferably has a rectangular cross section. The bulged portion 4 extends along the entire length of the fluid line parallel to the passage 2. At least two oppositely-disposed grooves 5 are provided in the bulged portion 4 extending parallel to the passage 2.

In accordance with the present invention, the fluid line 1 should be formed by extrusion, preferably of aluminum or plastic. According to the requirements of a particular installation, a defined length can be cut from the unfinished line made by extrusion and can be equipped with receiving bores 8 extending inwardly from the end face 7 of the bulged portion 4. The receiving bores 8 extend into the passage 2 and are formed so that they can receive pipe connectors 10, equipped with gaskets 9, of fuel injection valves 12 in a sealing manner. Upon insertion the fuel injection valves 12 are retained on the fluid line 1 by means of spring clamps 13, wherein flanges 21 on the clamps 13 are seated in the grooves 5 of the bulged portion 4 while on the other side of the spring clamp 13 a clamping means 24 is provided to engage a clamp groove 14 of the pipe connector 10 on the fuel injection valve 12. Into one end 15 of the fuel distribution line 1 a hose connection 16 can be threaded and into the other end a pressure control valve 18 of a known construction can be provided. Then the fuel injection valves 12 are inserted with their opposite nozzle ends into the several suction lines, not shown, of the internal combustion engine.

The clamps 13, made from spring material, are shown in detail in FIGS. 3 and 4. The cross section of each clamp 13 is U-shaped. Each clamp 13 has at its open end a flange 21 curved inwardly from each leg 20, which can be seated in the grooves 5 of the bulged portion 4 of the fluid line, when assembled. A separation groove 22 separates a cross piece 23, connecting the legs 20, from a snap connector 24 formed by tabs 25, which together define an opening 26 between them for seating the clamp groove 14 of the fuel injection valve 12, upon assembly.

Fastening the finished fluid line 1 as a fuel supply line on the internal combustion engine can be done by the provision of at least one support bore 28, extending at right angles to the passage 2, in the bulged portion 4, through which a screw 29 can be passed, by means of which the fuel supply line can be fastened on a support element 30 connected to an internal combustion engine 31.

The fluid line in accordance with the present invention has the advantage that an unfinished line can be formed by extrusion from, for instance, aluminum or plastic, from which a section can be cut in accordance with the requirements of a particular engine, which can then be supplied with the necessary receiving bores for the injection valves.

The foregoing relates to a preferred exemplary embodiment of the invention, it being understood that other embodiments and variants thereof are possible within the spirit and scope of the invention, the latter being defined by the appended claims.

What is claimed and desired to be secured by Letters Patent of the United States is:

1. In an improved linear fuel line provided with a passage along its entire length, the improvement comprising an integral, off-standing bulged portion extending along the entire length of said passage in said line and parallel to the passage, said bulged portion is provided with at least two oppositely-disposed grooves extending parallel to the passage, and has a rectangular cross section with a flat bottom surface, and said passage is provided in a portion of said fuel line having a semi-circular cross section which adjoins said bulged portion to form a cylindrical passage.

2. In an improved linear fuel line provided with a passage along its entire length, the improvement comprising an integral, off-standing bulged portion extending along the entire length of said passage in said line and parallel to the passage, said bulged portion is provided with at least two oppositely-disposed grooves extending parallel to the passage, and has a rectangular cross section with a flat bottom surface, said bulged portion is selectively provided with receiving bores perpendicular to the bottom surface and in communication with the passage, each of said receiving bores being so constructed to receive a pipe connector of a fuel injection valve therein, whereby said fuel line serves as a fuel distributing line for a fuel injection system, and each of said injection valves are sealed in the receiving bore of the fuel distribution line via a gasket and retained in position by means of a spring clamp, such said spring clamp having flanges on one extremity adapted to be seated in the oppositely disposed grooves on said bulged portion and further having means on an opposite extremity to engage the pipe connector of one injection valve.

3. In an improved linear fuel line in accordance with claim 1, wherein said fuel line is formed of aluminum.

4. In an improved linear fuel line in accordance with claim 1, wherein said fuel line is formed of plastic.

5. In an improved linear fuel line in accordance with claim 1, wherein said bulged portion is selectively provided with receiving bores perpendicular to the bottom surface and in communication with the passage, each of said receiving bores being so constructed to receive a pipe connector of a fuel injection valve therein, whereby said fuel line serves as a fuel distributing line for a fuel injection system.

6. In an improved linear fuel line in accordance with claim 2, wherein said bulged portion is provided with at least one support bore extending transversely to said passage, which bore is arranged to receive bolt means associated with brackets connected to an internal combustion engine on which said fuel line is used.

7. A method of forming an improved fuel line which comprises extruding a linear piece of material including a semicircular portion and a rectangular cross section portion with said semicircular portion forming a cylindrical passage along the length of said extruded linear piece of material.

* * * * *